April 13, 1948. T. G. HOWELLS 2,439,623
SUPPORT FOR VEHICLES
Filed June 24, 1946 2 Sheets-Sheet 2

Inventor
Thomas G. Howells

Patented Apr. 13, 1948

2,439,623

UNITED STATES PATENT OFFICE 2,439,623

SUPPORT FOR VEHICLES

Thomas G. Howells, Girard, Ohio

Application June 24, 1946, Serial No. 678,730

2 Claims. (Cl. 224—29)

This invention relates to attachments or supports on trucks or other vehicles for carrying round bars or tubular material on the side thereof in such a manner that the vehicles will not be injured by the material and that the material may be readily and quickly loaded or unloaded.

One of the advantages in the use of this support is that the unloading can take place sideways of the vehicle when in close quarters, because the material is carried on the side and does not stick out behind the vehicle.

This also has the advantage that room is left in the hold for carrying other types of material simultaneously.

Another advantage resides in the fact that the supports are very easily attached and as easily detached when not needed.

These and other objects and advantages will be readily understood from the following description aided by the accompanying drawing, wherein one embodiment of the invention has been illustrated and like reference characters denote the same details in the different views.

In the drawings:

Figure 3 is a view in side elevation of a truck with the supports carrying the load of tubes;

Figure 1:
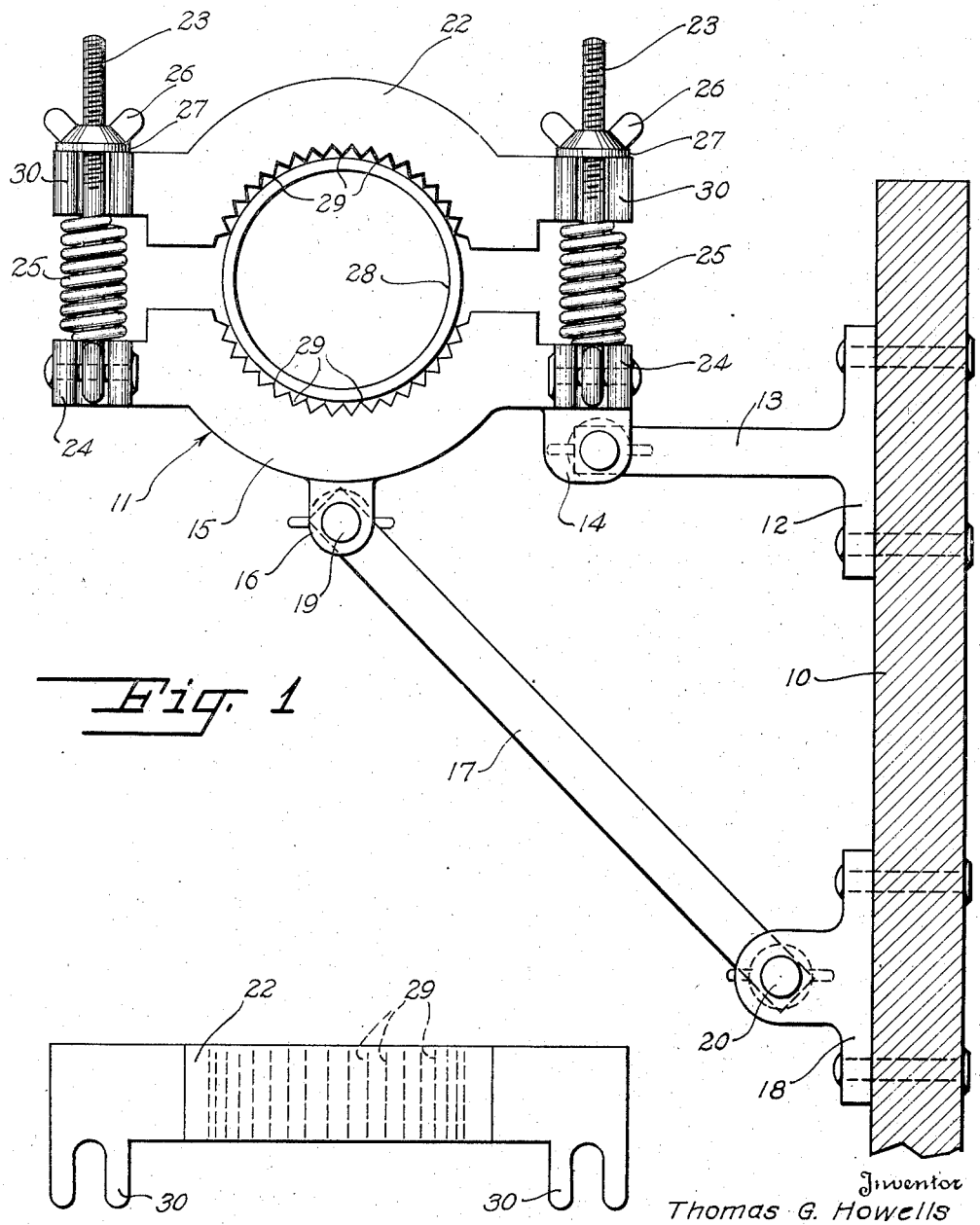
Figure 1 is a view in side elevation of the support as secured on the side of the body of a truck or other vehicle.
Figure 2:
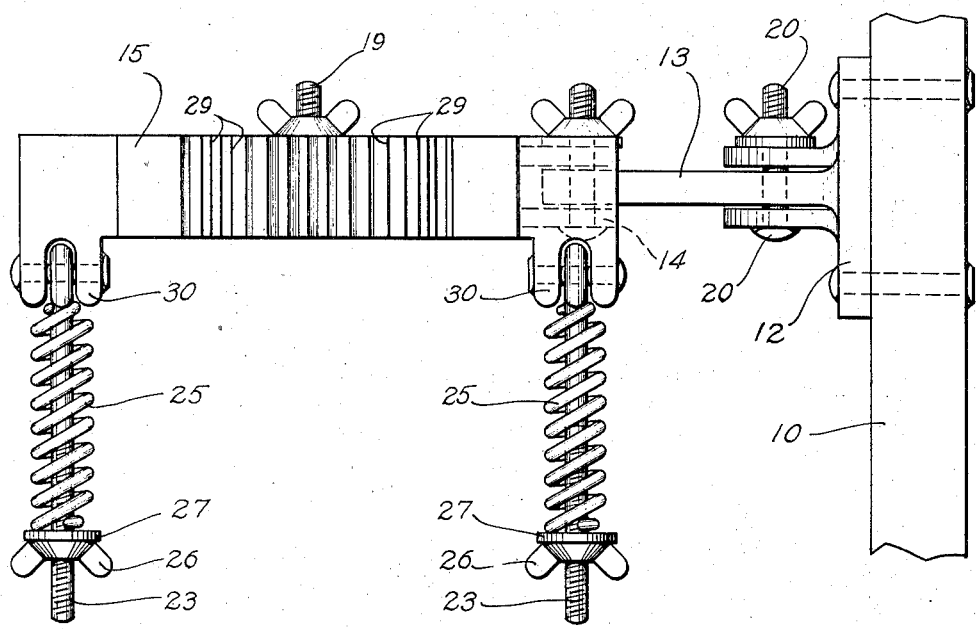
Figure 2 is a top plan view of Figure 1 with the cap removed.
Figure 4:
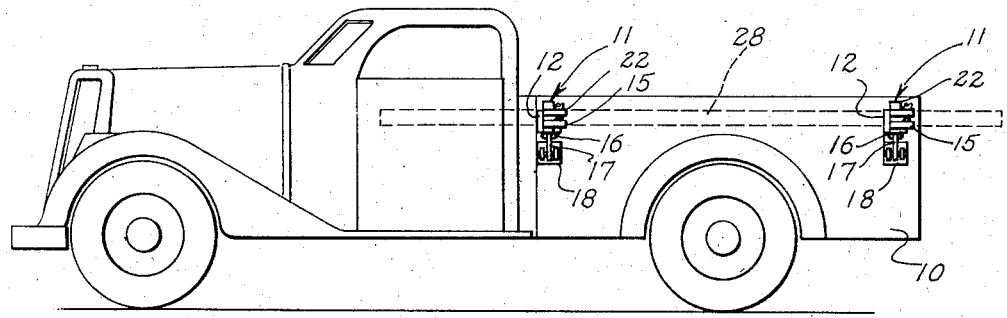
Figure 4 is a top plan view of the cap for the support.

The side wall of a truck or other vehicle is denoted by numeral 10 on the outside of which the support, denoted in general by numeral 11, is firmly secured by a bracket 12, riveted thereto. The bracket 12 has an arm integral therewith, extending straight out from the truck wall 10 and having its free end engaging a lug 14 with a pin or bolt in the lower half 15 of the support 11.

Another lug 16 on the under side of the support-half 15 has a link connection 17 with a securing plate 18 also riveted to the body wall 10. Said plate 18 is preferably secured lower down on the truck body wall 10 and the link 17 accordingly runs in an inclined direction against the truck wall and is removably attached to the lug 16 and the plate 18 by means of pins 19 and 20, respectively.

The upper half of the support 11 consists of an up and down slidable cap 22 carried on two threaded rods 23 which are hinged one on each side, on studs 24 in suitable lugs, on the lower half 15 of the support. Around each of the rods 23 is provided a compression spring 25 between the adjacent surfaces of the cap 22 and the lower half 15 of the support.

The upper ends of the hinged clamping rods 23 are threaded to carry wing nuts 26 over washers 27 in order to tighten down the cap over a tube 28 placed on the lower half 15 of the support. Both the cap 22 and the lower half 15 of the support are provided with radial serrations or teeth 29 on their concave surfaces in order to have a good hold on the tube 28.

In order to comfortably deposit a tube 28 in the support 11 the caps 22 have to be removed first. This can be done by first taking off the nuts and washers 26, 27, when the cap will be free to be lifted off. A better way is to only loosen the said nuts and washers, when the cap 22 can be slipped off lengthwise of the tube.

This will be possible because of the fact that the cap 22, like the bottom half 15 is provided with lugs 30 open in front, permitting the swinging out of the hinged rod 23 together with the spring washer and nut 25, 26 and 27.

A great advantage obtained by providing these supports on a truck is that any tubes, pipes, rods or bars clamped down in the supports stay there firmly without rolling around causing damage to themselves or other nearby articles carried on the truck or to the truck itself.

It is to be understood that the invention as herein disclosed may be varied from the details described and shown without departure from the spirit of the subjoined claims.

I claim:

1. A load-carrying attachment for trucks, comprising a load support consisting of a pair of jaws, one of which being fixed on the side of a truck, the other jaw forming a mating cap removably supported on the fixed jaw, and means for tightening the jaws together to firmly secure the load between them consisting of a pair of rods secured in said fixed jaw adapted for holding engagement with said cap, springs on said rods tending to open said jaws, lugs on said cap providing a side opening for sideways entering of the rods in the cap.

2. A load-carrying attachment for trucks, comprising a short rigid arm designed for attachment to a side of a truck to extend outwardly therefrom, a pair of arcuate coacting jaws each having oppositely directed end extensions, a depending lug carried upon the underside of an end extension of one of the jaws, the said one of the jaws constituting the lower jaw of the pair, means coupling said lug to the outer end of said arm, a second lug carried by the lower jaw, bracing means connecting the second lug with the truck body below said arm, a pair of sideway extending ears upon each end extension of the said lower jaw, a rod pivotally supported at one end between each pair of ears and having screw threads adjacent to its other end, a pair of spaced sideway extending ears upon each end of the upper jaw adapted to coact with the adjacent ears of the lower jaw and each adapted to receive the adjacent rod between them, a spring encircling each rod and adapted to be compressed between upper and lower pairs of said ears carried by the upper and lower jaws, and a securing nut threaded on the threaded end of each rod for engagement with the adjacent ears of the upper jaw to force the upper jaw downwardly against said spring into work holding relation with the lower jaw.

THOMAS G. HOWELLS.

REFERENCES CITED

The following references are of record in the file of this patent:

UNITED STATES PATENTS

| Number | Name | Date |
| --- | --- | --- |
| 1,497,564 | Howells | June 10, 1924 |
| 1,858,144 | Fariello | May 10, 1932 |
| 2,133,197 | Innocenti | Oct. 11, 1938 |
| 2,179,251 | DeRight et al. | Nov. 7, 1939 |

FOREIGN PATENTS

| Number | Country | Date |
| --- | --- | --- |
| 52,662 | Germany | June 18, 1890 |